US009621555B2

(12) United States Patent
Odenheimer

(10) Patent No.: US 9,621,555 B2
(45) Date of Patent: Apr. 11, 2017

(54) INFORMATION LEVEL AGREEMENTS FOR ENTERPRISE CLOUD DATA

(71) Applicant: Jens Odenheimer, Karlsruhe (DE)

(72) Inventor: Jens Odenheimer, Karlsruhe (DE)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 13/873,088

(22) Filed: Apr. 29, 2013

(65) Prior Publication Data

US 2014/0325600 A1 Oct. 30, 2014

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC .......... *H04L 63/10* (2013.01); *H04L 63/0281* (2013.01)

(58) Field of Classification Search
USPC ...................................................... 726/4, 30
See application file for complete search history.

(56) References Cited

U.S. PATENT DOCUMENTS

| 6,161,107 A * | 12/2000 | Stern ................. G06F 17/30017 707/722 |
| 7,853,786 B1 * | 12/2010 | Fultz et al. ..................... 726/30 |
| 8,595,799 B2 * | 11/2013 | Afek et al. ......................... 726/4 |
| 8,689,354 B2 * | 4/2014 | Grube et al. ..................... 726/30 |
| 8,762,480 B2 * | 6/2014 | Park et al. ...................... 709/216 |
| 8,819,768 B1 * | 8/2014 | Koeten ................. H04L 41/022 380/270 |
| 2011/0314071 A1 * | 12/2011 | Johnson et al. ............... 707/827 |
| 2012/0072969 A1 * | 3/2012 | Aratsu .................. G06F 21/604 726/1 |
| 2012/0265803 A1 * | 10/2012 | Ha et al. ........................ 709/203 |
| 2012/0303736 A1 * | 11/2012 | Novotny et al. .............. 709/213 |
| 2013/0066940 A1 * | 3/2013 | Shao ............................ 709/201 |

* cited by examiner

*Primary Examiner* — Michael R Vaughan
*Assistant Examiner* — Vadim Savenkov
(74) *Attorney, Agent, or Firm* — Mintz Levin Cohn Ferris Glovsky and Popeo, P.C.

(57) ABSTRACT

In some example implementations, a method may include receiving, at a broker, authorization to access at least one cloud service provider; receiving, at the broker, a message representative of at least one of a submission of data to or a request for data from the at least one cloud service provider; determining, by the broker based on a classification of the data, whether to authorize the at least one of the submission of data to or the request for data from the at least one cloud service provider; and forwarding, by the broker based on the determining, the at least one of the submission of data to or the request for data from the at least one cloud service provider, wherein the receiving authorization, the receiving the message, the determining, and the forwarding are implemented by at least one processor. Related systems, methods, and articles of manufacture are also provided.

17 Claims, 3 Drawing Sheets

INFORMATION LEVEL AGREEMENTS FOR ENTERPRISE CLOUD DATA

TECHNICAL FIELD

This disclosure relates generally data classification of cloud data.

BACKGROUND

Although the focus of cloud computing has primarily been on providing Software as a Service, providers of cloud services ("cloud service providers") have to be able to handle a wide variety of consumption models including so-called "big data" and data from heterogeneous data sources. Big data and heterogeneous data sources may include public data sources, such as RSS feeds, Twitter feeds, social media content, and the like. These public data sources allow big data analysis, providing analytical information, which may be of benefit to an end-user.

SUMMARY

In some example implementations, there is provided a method. The method may include receiving, at a broker, authorization to access at least one cloud service provider; receiving, at the broker, a message representative of at least one of a submission of data to or a request for data from the at least one cloud service provider; determining, by the broker based on a classification of the data, whether to authorize the at least one of the submission of data to or the request for data from the at least one cloud service provider; and forwarding, by the broker based on the determining, the at least one of the submission of data to or the request for data from the at least one cloud service provider, wherein the receiving authorization, the receiving the message, the determining, and the forwarding are implemented by at least one processor.

In some variations, one or more of the features disclosed herein including the following features can optionally be included in any feasible combination. The broker may interface at least one system and the at least one cloud service provider. The broker may include one or more rules to classify data for the at least one system. The broker may classify data based on the one or more rules, the one or more rules classifying data into categories including private data accessible to only the at least one system, public data accessible publically, and peer-sharable data accessible to the at least one system and at least one other system designated by the at least one system. The at least one cloud service provider may include a private cloud storing data classified as private, a public cloud storing data classified as public, and a business cloud storing data classified as sharable among peers.

Articles are also described that comprise a tangibly embodied machine-readable medium embodying instructions that, when performed, cause one or more machines (for example, computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

While public data sources and its analysis may help identify trends and assist in decision-making, it may be considered problematic to base strategic business decisions solely on public sources of data. Accordingly, private data (for example, private business data, peer business data, and the like) may need to be combined with public data to offer enhanced analysis and thus enhanced decision making. For example, a system processing public data and private data, such as a company's private data and/or data from a company's peers, may achieve better analytic results, when compared to a business system that analyzes only public data or only private data.

In some example implementations, the subject matter disclosed herein relates to making private data available to a system that is also configured to process public data and the like. For example, the subject matter disclosed herein may provide a classifier to classify data into one or more categories to allow distinguishing portions, or pieces, of data that are classified as public data, private business data, peer shareable data, and/or any other category. This classification of data enables the system to provide to, or access data from, a corresponding cloud service. Moreover, the classification may be performed in accordance with one or more information level agreements defining the classification of different types of data or specifically identified data.

Figure 1:
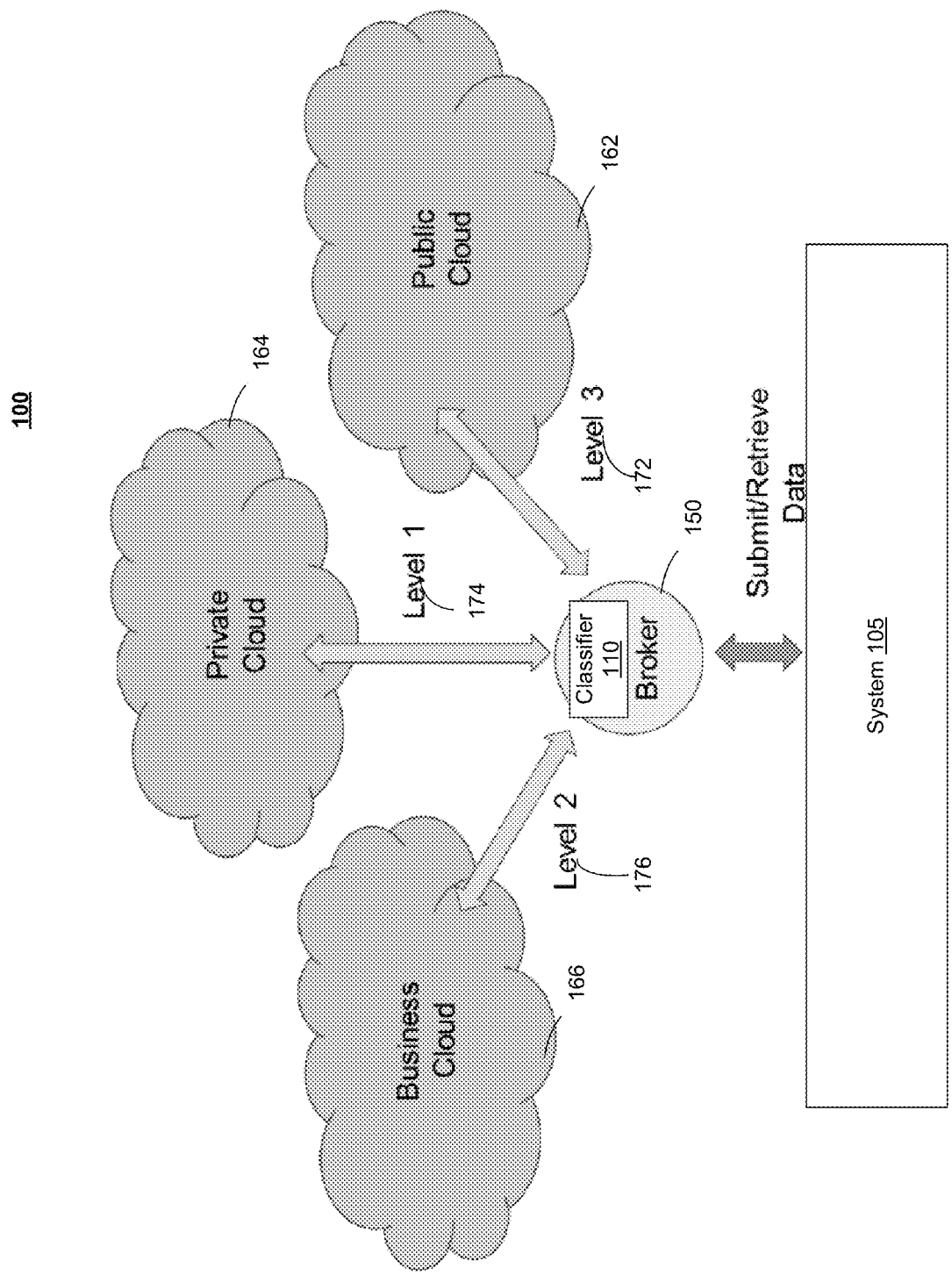
FIG. 1 illustrates an example system for classifying and sharing data, according to some implementations of the current subject matter.

FIG. 1 depicts an example of a system 105, such as a business system, an enterprise resource planning system, a business intelligence system, and/or any other type of system.

The system 105 may be coupled via one or more networks to one or more cloud service providers, such as a public cloud 162, a private cloud 164, and a business cloud 164. The public cloud 162 may include a cloud service provider storing information that is publically accessible, and thus not proprietary, private, and/or sensitive. The private cloud 164 may include a cloud service provider storing information that is private to a business/company, and thus not generally considered sharable outside of the company. And, business cloud 164 may include a cloud service provider storing information that is not public but shareable within a restricted group, such as peer company's of the company using system 105. In the case of peer-sharable data, system 105 may include in one or more information level agreements the identity of documents and/or types of documents that can be shared and the systems, or identities of, peers authorized to share the peer-sharable data.

System 105 may also include, or be coupled to, a broker 150. Broker 150 may control the handling of data and, in particular, how the data may be retrieved from a cloud service provider and/or how the data is stored. In some example implementations, the broker 150 may include rules, such as one or more information level agreements, specifying the types or identities of data that can be shared and specifying the classification levels of different types of data.

The system 105 may further include a classifier 110 for classifying data into one or more categories to enable providing data to and/or accessing data from one or more cloud service providers. Although the classifier 110 is shown at system 105, the classifier 110 may also be located at broker 150 as well.

System 105 may be configured to selectively share (for example, under the programmatic control of a user of the business system and the one or more information level agreements) only the data that system 105 considers sharable via a certain type of cloud. In some example implementations, the sharing of private business data is performed selectively based on classifier 110 classifying data into one or more levels as disclosed herein. Furthermore, these levels may be specified in one or more information level agreements defining and/or regulating the sharing of data with the clouds 162-166.

In some example implementations, portions of information are classified, as noted, by classifier 110. For example, classifier 110 may classify data according to one of a plurality of levels. To illustrate further, the classifier 100 may classify a certain company's discount list as "private" or level 1 as the company would not want to share or make public the discounts it gives to its customers. In this example, the data information representative of the discount list may be assigned a classification level of "private" and/or assigned a level "1" classification 174. Continuing with the example, the company may, however, consider sales volume for a certain product group in a certain region of the world to be sensitive but not as sensitive as the "private" data, so the sales volume may be assigned a classification level of "2" 176, which may represent data that can be shared with a restricted group, such as peer companies. And, the company may assign a classification level of "3" 172 to information that can be shared publically, and thus not considered private, sensitive, and the like. An example of the type of data that can be classified as "publically" sharable (for example, level 3) is revenue that has been disclosed in a quarterly or end-of-year report. Moreover, the classification may be performed in accordance with an information level agreement specifying the levels of access the identities or types of users/entities authorized to access each level, the types of information associated with the levels. For example, the information level agreement may specify the types or identities of data that are private. Specifically, the information level agreement may define that discount list should be treated as level 1, private, or the information level agreement may include document identifiers for all of the level 1, private data, which in this example would include the discount list, as well as any other levels being used at system 100.

Tables 1 and 2 below depict examples of data classified by classifier 110. In the example of Tables 1 and 2, the data submitted to and retrieved from the cloud service provider are classified as level 2 (see, for example, "<InformationLevel>2</InformationLevel>").

In some example implementations, a broker 150 may control the handling of data and, in particular, how the data may be retrieved from a cloud service provider, and/or how the data is stored. For example, broker 150 may evaluate the classification assigned to portions of data and determine whether the data can be stored in a given cloud. For example, broker 150 may have a set of rules, such as one or more information level agreements, enabling broker 150 to store data classified as private, level 1 data private cloud 164. Broker 150 may have a set of rules, such as one or more information level agreements, enabling the broker 150 to store data classified as level 2 date to business cloud 166, and the set of rules/information level agreements may also enable the broker 150 to store data classified public level 3 to public cloud 163. For example, publically shareable portions of data may be stored in a public cloud. Referring to the previous example of the company, the private cloud 164 may be implemented as a cloud service accessible only by the company, a shared business cloud 166 may be implemented as a cloud service accessible by the company and one or more of its peers, and the public cloud 162 may be implemented as a cloud service accessible by the company, one or more of its peers, and the public generally.

In some example implementations, a broker 150 may be implemented by an in-memory database, which may provide enhanced processing speed and classification/brokering, when compared to a broker implemented using other approaches, such as optical or mechanical persistent storage.

In some example embodiments, broker 150 may also control consumption, such as requesting data from cloud service providers. For example, data may be requested from a cloud under the control of broker 150. When this is the case, broker 150 may mediate between the requestor, such as system 105, and the information provider, such as a cloud service provider. In some example implementations, system 105 may send a request, such as a request formatted in accordance with Table 1, for data to broker 150. The broker 150 analyzes the request and then calls a cloud service provider, such as cloud services 162-166 in order to determine whether the requesting party may receive the desired data. If so, the data is retrieved from the cloud service provider and then forwarded to the system 105.

Figure 2:
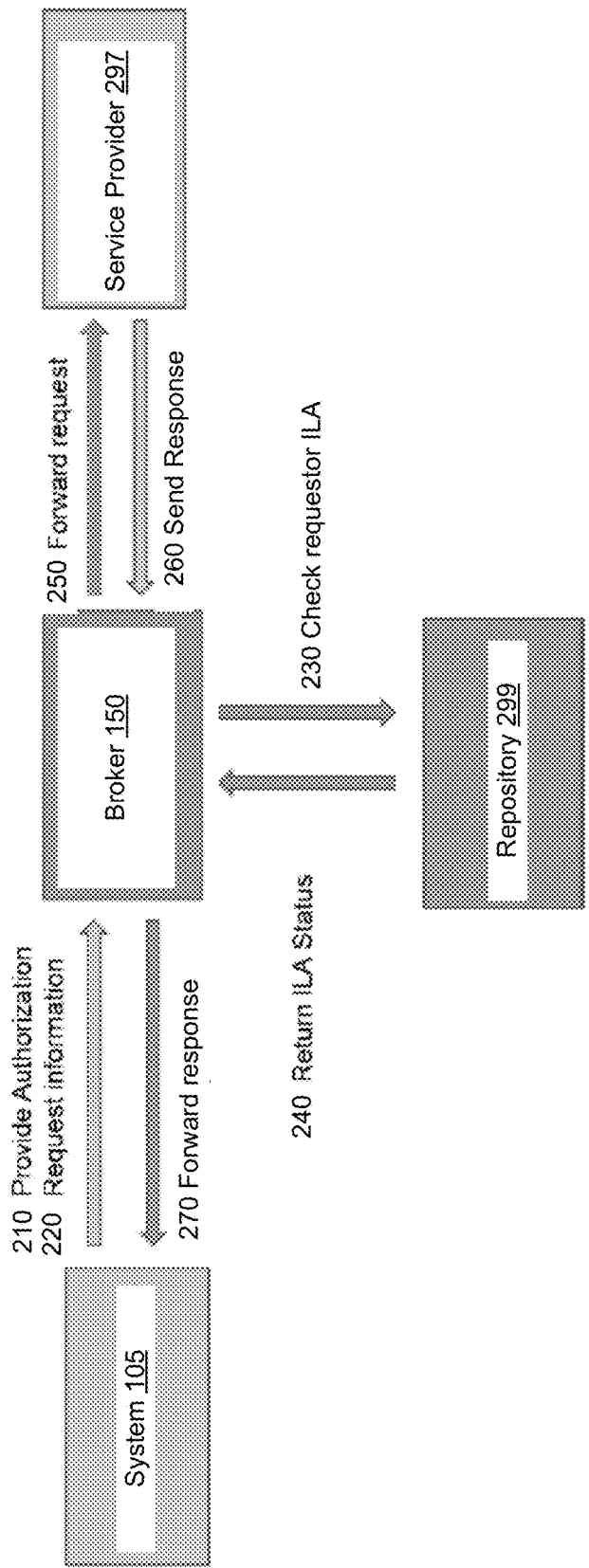
FIG. 2 illustrates a process for requesting data, according to some implementations of the current subject matter.

FIG. 2 depicts a process 200 for requesting data from cloud service providers. The description of FIG. 2 also refers to FIG. 1.

At 210, system 105 may send a message to authorize broker 150 to request data from one or more cloud service providers. The authorization may specify the categories or classifications of data to be requested from cloud service providers, and may specify the types or identities of cloud service providers where data can be requested. For example, the authorization may specify that only data information representative a classification level of "private" and/or assigned a level "2" classification 174 may be requested from a cloud service provider authorized to handle that type of data, such as business cloud 166. And, these authorizations may be contained in one or more information level agreements.

At 220, system 105 may send a request to broker 150 to obtain data from a cloud service provider. The request may indicate the specific data being requested, the classification of the requested data, and potential clouds containing the requested data. Table 1 represents an example of a request sent to broker 150 for data to be obtained from a cloud service provider, such as business cloud service provider 166.

TABLE 1

```
<BusinessDataRequestor >
<Company> Shoe Inc. </ Company >
<CompanyCode> 123435 </ CompanyCode >
<InformationLevel> 2</ InformationLevel >
</BusinessDataRequestor >
<BusinessDataRequest >
<BusinessEntitiy> Sales </ BusinessEntitiy >
<BusinessArea> Apparel</ BusinessArea >
<BusinessLocation> North-America</ BusinessLocation
>
<BusinessYear> North-America</ BusinessYear >
<ProductGroup> Shoes </ ProductGroup >
</BusinessDataRequest >
```

TABLE 2

```
<BusinessDataSubmitter >
<Company> Footwear Inc. </ Company >
<CompanyCode> 987654 </ CompanyCode >
<InformationLevel> 2</ InformationLevel >
</ BusinessDataSubmitter >
<BusinessDataSubmission >
<BusinessEntitiy> Sales </ BusinessEntitiy >
<BusinessArea> Apparel</ BusinessArea >
<BusinessLocation> North-America</ BusinessLocation >
<BusinessYear> North-America</ BusinessYear >
<ProductGroup> Shoes </ ProductGroup >
<Quantity> 1.900.000 </ Quantity >
<SalesVolume> 45.300.000 </ SalesVolume >
<SalesCurrency> USD </ SalesCurrency >
</ BusinessDataSubmission >
```

At 230, the broker 150 checks repository 299 including one or more information level agreements to determine whether the request is authorized to be obtained from a certain cloud service provided and returned to systems 105. For example, system 105 may not be allowed to request a specific level of data, such as personalized data.

At 240, the status of the ILA check may be returned to system 105. This status may be for example a notification of a successful check of an ILA indicating that the transfer of data is authorized and can be initiated, the status may comprise a notification that the requestor is not allowed to request this level of data, in which case no data stream is initiated At 250, the broker 150 may send a request for data to a cloud service provider. For example, the request may be for peer data stored at business cloud 166, in which case the request is sent to a cloud service provider 299, which may be an interface that obtains the requested data from business cloud 166 and returns, at 260, the category 2 peer data to broker 150 and, at 270, to system 105.

In some example implementations, broker 150 may also control the submission of data to cloud service providers. For example, system 105 may send data to broker 150, which determines the classification level of the data. It updates the information level agreement repository for the submitting party, such as system 105, registering the amount of data and the corresponding classification level of the data being sent to the cloud. Depending on the classification level of the data being sent to the cloud, broker 150 may then forwards the data to a data cleansing filter, which removes company specific information.

Figure 3:
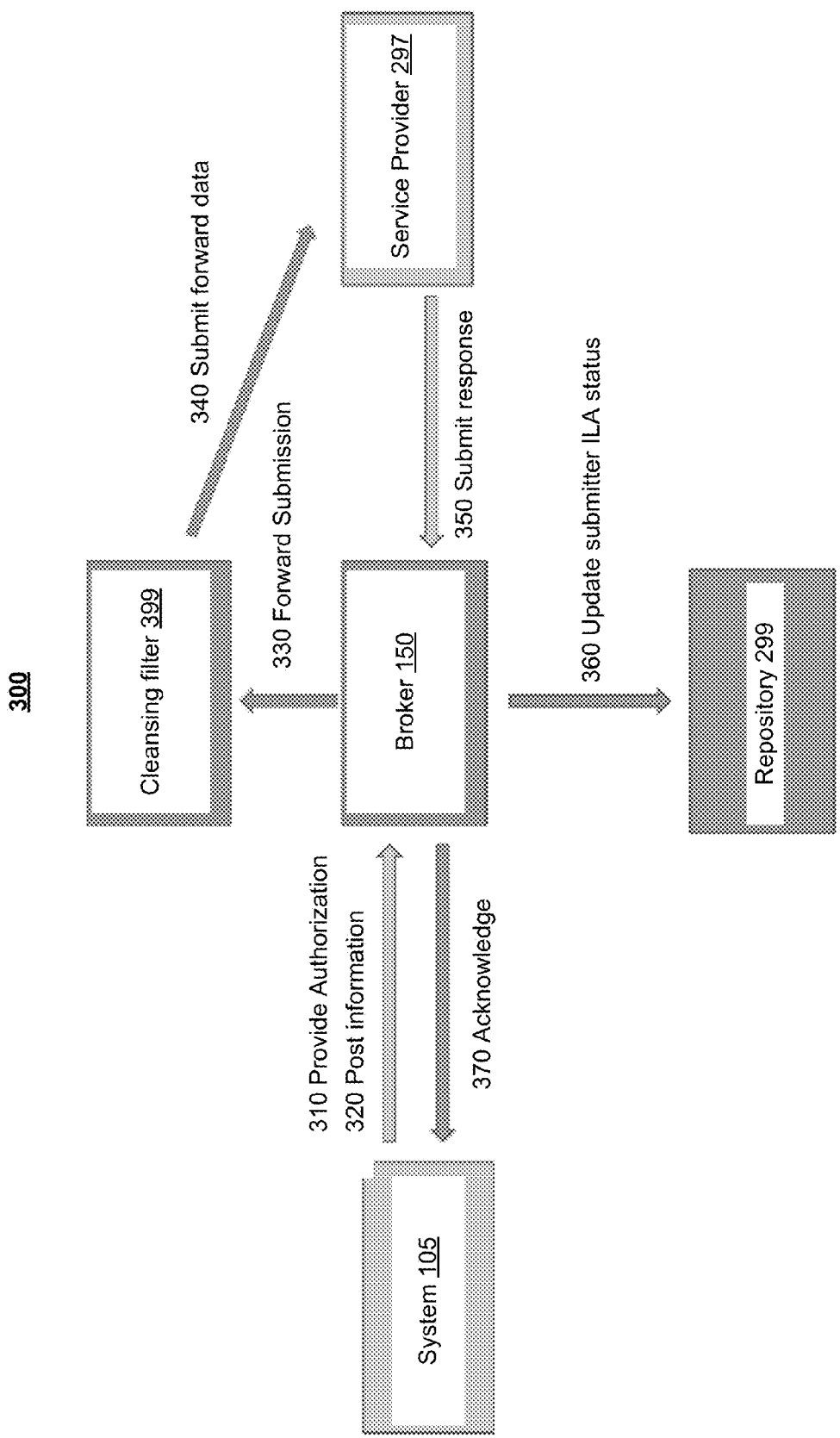
FIG. 3 illustrates a process for providing data, according to some implementations of the current subject.

FIG. 3 depicts a process 300 for providing data to cloud service providers. The description of FIG. 3 also refers to FIG. 1.

At 310, system 105 may send a message to authorize broker 150 to provide data to one or more cloud service providers. The authorization may specify the categories or classifications of data to be requested from cloud service providers, and may specify the types or identities of cloud service providers where data can be requested. For example, the authorization may specify that only data information representative a classification level of "private" and/or assigned a level "2" classification 174 may be requested from a cloud service provider authorized to handle that type of data, such as business cloud 166.

At 320, system 105 may send a data submission to broker 150 data to be posted to a cloud service provider. Table 2 represents a submission via broker 150 of data to be provided to a cloud service provider, such as business cloud service provider 166.

The broker 150 may check, based on one more information level agreements, the data provided by system 105 to make sure it only includes a classification authorized to be posted to a cloud service provider. For example, the data posted may comprise public data to be posted to a public cloud. In this example, broker 150 may provide, at 330, the data to be posted to a data cleansing filter 399 that searches for data not authorized for release. In this example, data cleansing filter 399 may search for private or peer data and, if found, delete the date before submission at 340 to a cloud service provider 299.

When cloud service provider 299 posts the data, cloud service provider 297 may acknowledge receipt at 350. The broker 150 may then update the repository 299, so that the metadata (for ILA) for system 105 indicates that certain data has been authorized and posted to a cloud. The broker 150 may also acknowledge the posting to the cloud by sending a message at 370 to business system 105.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, for example, in a machine readable storage device or in a propagated signal, for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method comprising:
receiving, at a broker interfacing at least one cloud service provider and client system associated with a user, data being submitted to or received from the at least one cloud service provider;
analyzing, by the broker, the content of the data to determine whether the data is authorized to be submitted, by the client system, to the at least one cloud service provider, or to be received, by the client system, from the at least one cloud service provider;
assigning, by the broker and based on the analyzing, a classification to the data, the classification indicating whether the data is authorized to be submitted, by the client system, to the at least one cloud service provider, or to be received, by the client system, from the at least one cloud service provider;
determining, by the broker and based on the assigned classification, whether to transmit the data for submission to the cloud service provider or transmit the data to the client system, the data further classified in accordance with a cloud service provider type; and
forwarding, by the broker and based on the determining, the data to the at least one cloud service provider or to the client system, wherein the broker comprises at least one processor.

2. The method of claim 1, wherein the broker includes one or more rules to classify, for the client system, the data in accordance with the cloud service provider type.

3. The method of claim 2 further comprising:
classifying, by the broker, data based on the one or more rules, the one or more rules classifying data into categories based on the cloud service provider type, including a first level classification corresponding to a private cloud including private data accessible to only the client system, a second level classification corresponding to a public cloud including public data accessible publically, and a third level classification corresponding to a peer cloud including peer-sharable data accessible to the client system and at least one other peer client system designated by the client system.

4. The method of claim 1, wherein the at least one cloud service provider includes at least one of the following cloud service provider types a private cloud storing data classified as private, a public cloud storing data classified as public, or a business cloud storing data classified as sharable among peers.

5. The method of claim 1, wherein the content of the data includes business information.

6. The method of claim 1, wherein the at least one cloud service provider includes metadata associated with the data stored in the at least one cloud service provider, and the method further comprises:
updating the metadata associated with the data stored in the at least one cloud service provider to include the determined classification of the data.

7. The method of claim 1, wherein the data comprises accompanying metadata containing information about the data and the method further comprises:
updating the metadata accompanying the data to include the determined classification of the data.

8. A non-transitory computer-readable storage medium including computer code, which when executed by at least one processor provides operations comprising:
receiving, at a broker interfacing at least one cloud service provider and a client system associated with a user, data being submitted to or received from the at least one cloud service provider;
analyzing, by the broker, the content of the data to determine whether the data is authorized to be submitted, by the client system, to the at least one cloud service provider, or to be received, by the client system, from the at least one cloud service provider;
assigning, by the broker and based on the analyzing, a classification to the data, the classification indicating whether the data is authorized to be submitted, by the client system, to the at least one cloud service provider, or to be received, by the client system, from the at least one cloud service provider;
determining, by the broker and based on the assigned classification, whether to transmit the data for submission to the cloud service provider or transmit the data to the client system, the data further classified in accordance with a cloud service provider type; and
forwarding, by the broker and based on the determining, the data to the at least one cloud service provider or to the client system.

9. The non-transitory computer-readable storage medium of claim 8, wherein the broker includes one or more rules to classify, for the at least one client system, the data in accordance with the cloud service provider type.

10. The non-transitory computer-readable storage medium of claim 9 further comprising:
classifying, by the broker, data based on the one or more rules, the one or more rules classifying data into categories based on the cloud service provider type, including a first level classification corresponding to a private cloud including private data accessible to only the client system, a second level classification corresponding to a public cloud including public data accessible publically, and a third level classification corresponding to a peer cloud including peer-sharable data accessible to the client system and at least one other peer client system designated by the client system.

11. The non-transitory computer-readable storage medium of claim 8, wherein the at least one cloud service provider includes at least one of the following cloud service provider types a private cloud storing data classified as private, a public cloud storing data classified as public, or a business cloud storing data classified as sharable among peers.

12. The non-transitory computer-readable storage medium of claim 8, wherein the data comprises accompanying metadata containing information about the data, and further comprising:
updating the metadata accompanying the data to include the determined classification of the data.

13. A system comprising:
at least one processor; and
at least one memory including computer code, which when executed by the at least one processor provides operations comprising:
receiving, at a broker interfacing at least one cloud service provider and a client system associated with a user, data being submitted to or received from the at least one cloud service provider;
analyzing, by the broker, the content of the data to determine whether the data is authorized to be submitted, by the client system, to the at least one cloud service provider, or to be received, by the client system, from the at least one cloud service provider;
assigning, by the broker and based on the analyzing, a classification to the data, the classification indicating whether the data is authorized to be submitted, by the client system, to the at least one cloud service provider, or to be received, by the client system, from the at least one cloud service provider;
determining, by the broker and based on the assigned classification, whether to transmit the data for submission to the cloud service provider or transmit the data to the client system, the data further classified in accordance with a cloud service provider type; and
forwarding, by the broker and based on the determining, the data to the at least one cloud service provider or to the client system.

14. The system of claim 13, wherein the broker includes one or more rules to classify, for the at least one client system, the data in accordance with the cloud service provider type.

15. The system of claim 14 further comprising:
classifying, by the broker, data based on the one or more rules, the one or more rules classifying data into categories based on the cloud service provider type, including a first level classification corresponding to a private cloud including private data accessible to only the client system, a second level classification corresponding to a public cloud including public data accessible publically, and a third level classification corresponding to a peer cloud including peer-sharable data accessible to the client system and at least one other peer client system designated by the client system.

16. The system of claim 13, wherein the at least one cloud service provider includes at least one of the following cloud service provider types a private cloud storing data classified as private, a public cloud storing data classified as public, or a business cloud storing data classified as sharable among peers.

17. The system of claim 13, wherein the data comprises accompanying metadata containing information about the data, the operations further comprising:
updating the metadata accompanying the data to include the determined classification of the data.

* * * * *